United States Patent
Paruchuri et al.

(10) Patent No.: US 11,093,536 B2
(45) Date of Patent: *Aug. 17, 2021

(54) EXPLICIT SIGNALS PERSONALIZED SEARCH

(71) Applicant: Microsoft Technology Licensing, LLC, Redmond, WA (US)

(72) Inventors: Sandeep Paruchuri, Seattle, WA (US); Robert Howard, Bellevue, WA (US); Jared Adam Brown, Kirkland, WA (US); Colleen Elizabeth Hamilton, Kirkland, WA (US); Paul Robert Nash, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 558 days.

This patent is subject to a terminal disclaimer.

(21) Appl. No.: 15/624,553

(22) Filed: Jun. 15, 2017

(65) Prior Publication Data

US 2017/0286530 A1    Oct. 5, 2017

Related U.S. Application Data

(63) Continuation of application No. 14/229,304, filed on Mar. 28, 2014, now Pat. No. 9,710,546.

(51) Int. Cl.
| | |
|---|---|
| *G06F 17/30* | (2006.01) |
| *G06F 16/33* | (2019.01) |
| *G06F 3/16* | (2006.01) |
| *G06F 16/9535* | (2019.01) |
| *G06Q 30/02* | (2012.01) |
| *G06F 16/335* | (2019.01) |

(52) U.S. Cl.
CPC .......... *G06F 16/3344* (2019.01); *G06F 3/167* (2013.01); *G06F 16/335* (2019.01); *G06F 16/9535* (2019.01); *G06Q 30/0271* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,662,177 B1 * 12/2003 Martino ................. G06Q 10/02
7,225,187 B2     5/2007 Dumais et al.
(Continued)

OTHER PUBLICATIONS

"Final Office Action Issued in U.S. Appl. No. 14/229,304", dated Mar. 15, 2016, 13 Pages.
(Continued)

*Primary Examiner* — Hung D Le
(74) *Attorney, Agent, or Firm* — Ray Quinney & Nebeker P.C.; Paul N. Taylor

(57) ABSTRACT

Methods, systems, and computer program products are provided that enable users to provide explicit declarations that are used to generate recommendations for the users. An explicit declaration is received from a user of a user device. The explicit declaration is configured to influence a subsequent recommendation. The words of the explicit declaration are processed to generate a record. A recommendation rule is generated based on the generated record. The recommendation rule is executed to generate a recommendation for the user. The generated recommendation is provided to the user.

20 Claims, 6 Drawing Sheets

(56) References Cited

U.S. PATENT DOCUMENTS

| | | | |
|---|---|---|---|
| 7,756,880 | B2 | 7/2010 | Sighart et al. |
| 7,870,117 | B1 | 1/2011 | Rennison |
| 7,890,526 | B1 | 2/2011 | Brewer et al. |
| 8,180,804 | B1 | 5/2012 | Narayanan et al. |
| 8,463,295 | B1* | 6/2013 | Caralis ................ H04W 4/021 |
| | | | 455/456.3 |
| 8,620,915 | B1 | 12/2013 | Brukman et al. |
| 8,799,280 | B2 | 8/2014 | Teevan et al. |
| 9,092,802 | B1 | 7/2015 | Akella |
| 2004/0267730 | A1 | 12/2004 | Dumais et al. |
| 2005/0076093 | A1 | 4/2005 | Michelitsch et al. |
| 2005/0097188 | A1* | 5/2005 | Fish .................... G06F 16/3338 |
| | | | 709/217 |
| 2006/0235817 | A1* | 10/2006 | Wong ........................ G06F 8/60 |
| 2006/0275118 | A1 | 12/2006 | Lee |
| 2006/0282856 | A1 | 12/2006 | Errico et al. |
| 2007/0112792 | A1 | 5/2007 | Majumder |
| 2007/0116250 | A1 | 5/2007 | Stafford |
| 2008/0189110 | A1* | 8/2008 | Freeman ............ G06Q 30/0269 |
| | | | 704/251 |
| 2008/0243784 | A1 | 10/2008 | Stading |
| 2008/0281808 | A1 | 11/2008 | Anderson et al. |
| 2009/0037355 | A1 | 2/2009 | Brave et al. |
| 2010/0030764 | A1 | 2/2010 | Koren |
| 2010/0042460 | A1 | 2/2010 | Kane, Jr. |
| 2010/0137902 | A1 | 6/2010 | Lee et al. |
| 2010/0222035 | A1 | 9/2010 | Robertson et al. |
| 2010/0251305 | A1 | 9/2010 | Kimble et al. |
| 2010/0262658 | A1 | 10/2010 | Mesnage |
| 2010/0318535 | A1 | 12/2010 | Weber et al. |
| 2011/0029509 | A1 | 2/2011 | Kumthekar et al. |
| 2011/0040756 | A1* | 2/2011 | Jones .................... G06F 16/951 |
| | | | 707/737 |
| 2011/0288912 | A1 | 11/2011 | McCrea et al. |
| 2011/0289015 | A1 | 11/2011 | Mei et al. |
| 2012/0254097 | A1* | 10/2012 | Flinn ........................ G06N 7/02 |
| | | | 706/52 |
| 2012/0303561 | A1 | 11/2012 | Sathish |
| 2012/0330939 | A1 | 12/2012 | McCloskey et al. |
| 2013/0055097 | A1 | 2/2013 | Soroca et al. |
| 2013/0191372 | A1 | 7/2013 | Lee et al. |
| 2014/0025490 | A1* | 1/2014 | Shekar ................ G06F 16/9535 |
| | | | 705/14.53 |
| 2014/0032358 | A1 | 1/2014 | Perkowitz et al. |
| 2014/0059128 | A1 | 2/2014 | Lee et al. |
| 2014/0108395 | A1 | 4/2014 | Polonsky et al. |
| 2014/0157295 | A1 | 6/2014 | Jagtiani et al. |
| 2014/0180760 | A1 | 6/2014 | Karatzoglou |
| 2014/0181100 | A1 | 6/2014 | Ramer et al. |
| 2014/0222622 | A1 | 8/2014 | Du et al. |
| 2014/0235484 | A1 | 8/2014 | Ambinder et al. |
| 2014/0278413 | A1 | 9/2014 | Pitschel et al. |
| 2014/0330770 | A1 | 11/2014 | Yerli |
| 2014/0365313 | A1* | 12/2014 | Reese ................ G06Q 30/0269 |
| | | | 705/14.66 |
| 2015/0106801 | A1 | 4/2015 | Agrawal et al. |
| 2015/0187024 | A1 | 7/2015 | Karatzoglou et al. |
| 2015/0220525 | A1 | 8/2015 | Ross et al. |
| 2015/0220602 | A1 | 8/2015 | Billou |
| 2015/0227987 | A1 | 8/2015 | Kumar et al. |

OTHER PUBLICATIONS

"Final Office Action issued in U.S. Appl. No. 14/229,304", dated Nov. 25, 2016, 13 Pages.

"Non-Final Office Action Issued in U.S. Appl. No. 14/229,304", dated Jun. 28, 2016, 14 Pages.

"Non-Final Office Action Issued in U.S. Appl. No. 14/229,304", dated Dec. 15, 2015, 12 Pages.

"Notice of Allowance Issued in U.S. Appl. No. 14/229,304", dated Mar. 17, 2017, 9 Pages.

"Office Action Issued in European Patent Application No. 15715072.3", dated Aug. 3, 2017, 6 Pages.

International Preliminary Report on Patentability Issued in PCT Application No. PCT/US2015/022347, dated Feb. 19, 2016, 8 Pages.

International Search Report and Written Opinion Issued in PCT Application No. PCT/US2015/022347, dated May 19, 2015, 9 Pages.

Gemmis, et al., "A Retrieval Model for Personalized Searching Relying on Content-Based User Profiles", In Proceedings of 6th AAAI Workshop on Intelligent Techniques for Web Personalization and Recommender Systems, May 9, 2008, 9 pages.

Lee, et al., "Proactive: Comprehensive Access to Job Information", In Journal of Information Processing Systems, vol. 8, Issue 4, Dec. 12, 2012, 18 pages.

Second Written Opinion Issued in PCT Application No. PCT/US2015/022347, dated Sep. 11, 2015, 7 Pages.

Virgil, Jesse, "Ness: Personalized Restaurant Recommendations", Published on: May 20, 2013, Available at: http://phone.appstorm.net/reviews/food-drink-reviews/ness-personalized-restaurant-recommendations/, 10 pages.

* cited by examiner ively. The detailed description is organized to first describe embodiments in which explicit signals are provided by a user in a physical store environment, and then to describe embodiments in which

EXPLICIT SIGNALS PERSONALIZED SEARCH

CROSS-REFERENCE TO RELATED APPLICATIONS

This application is a continuation of allowed U.S. application Ser. No. 14/229,304 filed on Mar. 28, 2014, titled "Explicit Signals Personalized Search," which is incorporated by reference herein in its entirety.

BACKGROUND

Within the field of computing, many systems exist that can infer information about an individual based on various signals and use such information to provide the individual with enhanced services and personalized content. For example, an e-commerce Web site may recommend products of interest to an individual based on inferences drawn from the individual's previous purchases. As another example, a search engine may personalize search results and related content to a user based on inferences made regarding the user. Traditionally, search engines derive such inferences from user queries, clicks, views, and occasionally by data mining social networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable users to provide explicit declarations that are used to personalize recommendations for the users. Such explicit declarations provide information regarding who the users are, and what the users actually want to see. A user may speak or otherwise provide an explicit declaration in a manner that indicates the explicit declaration is to be used to influence subsequent recommendations. A recommendation may be generated and provided to the user immediately after the user provides the explicit declaration, or the recommendation may be provided later. The recommendation may be triggered to be provided to the user based on a time, a location of the user, one or more persons with the user, an activity of the user, a request from the user for data, a request from the user for a recommendation, and/or another trigger.

In one exemplary method implementation, an explicit declaration is received from a user of a device. The explicit declaration is configured by the user to influence a subsequent recommendation. The words of the explicit declaration are processed to generate a record. A recommendation rule is generated based on the generated record. The recommendation rule is executed to generate a recommendation for the user. The generated recommendation is provided to the user.

For instance, in one aspect, natural language processing may be performed on a series of words of the explicit declaration to extract one or more key features. The record may be generated to include the extracted key feature(s). The extracted key feature(s) may be used to generate the recommendation rule corresponding to the explicit declaration.

In an aspect, it may be determined whether there is a match between the rule and an environmental trigger. Examples of environmental triggers include a current time, a future time, a current location of the user, a future location of the user, a person with the user, an activity of the user, an application or service, a request from the user for data, a request from the user for a recommendation, etc. When there is a match, the matching recommendation rule is executed to generate the recommendation for the user.

In another implementation, a recommendation system that is implemented in one or more computing devices is provided. The recommendation system includes a voiced input interface, a speech processing module, a rules generator, and a recommendation engine. The voiced input interface is configured to receive an explicit declaration from a user of a computing device. The explicit declaration includes a series of words, and is configured to influence a subsequent recommendation. The speech processing module is configured to process the series of words of the explicit declaration to generate a record. The rules generator is configured to generate a recommendation rule based on the generated record. The recommendation engine is configured to execute the recommendation rule to generate a recommendation for the user.

A computer readable storage medium is also disclosed herein having computer program instructions stored therein that enables a user to provide an explicit declaration, and causes a recommendation to be generated for the user based at least in part on the explicit declaration, according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
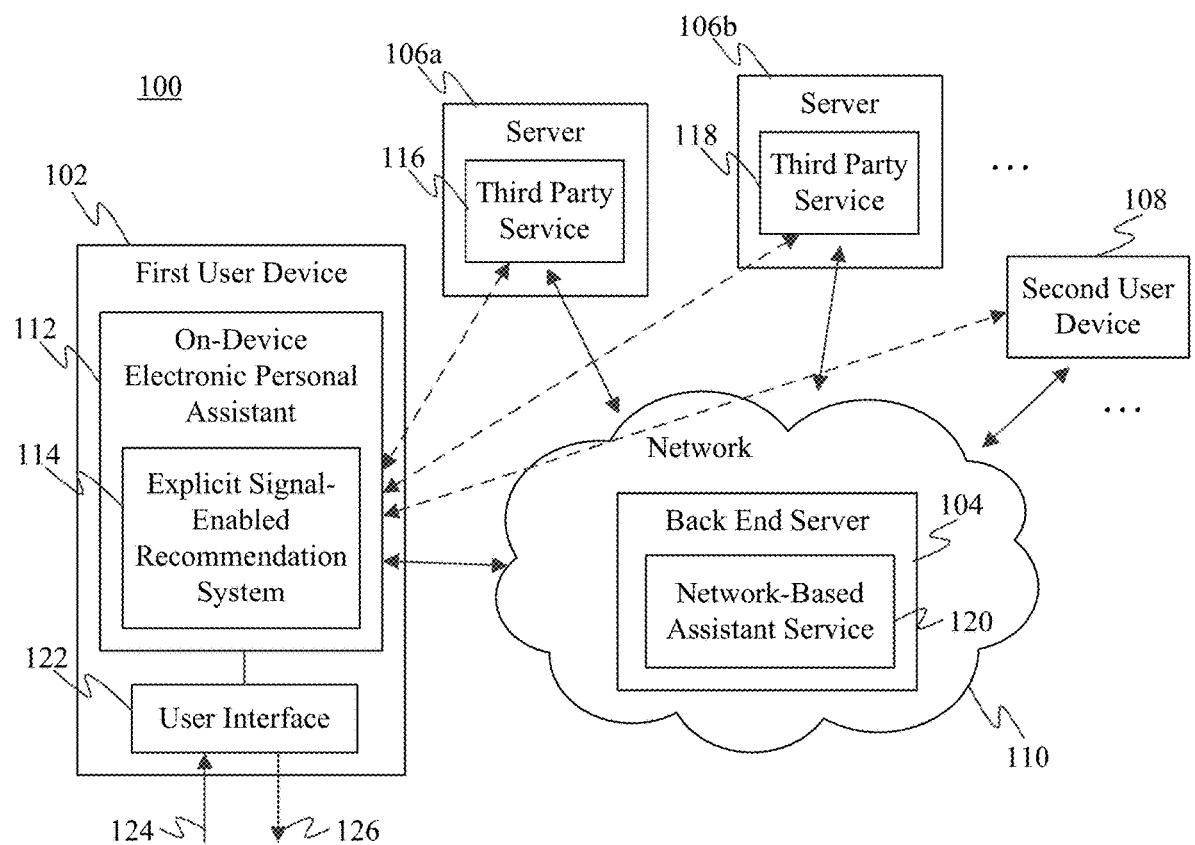
FIG. 1 shows a block diagram of a system in which a user device that includes an explicit signal-enabled recommendation system communicates with one or more servers and/or other user devices to exchange information, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Embodiments described herein enable personalized recommendations to be generated for users based on explicit declarations. The user may speak or otherwise provide the explicit declaration (e.g., by text entry, etc.) to a computing device (also referred to as "user device"). For instance, the user device may include a digital personal assistant or other entity configured to handle explicit declarations as disclosed herein. An explicit declaration is configured to influence a subsequent recommendation to be made to the user that provided the explicit declaration. Such an explicit declaration is made by the user in "real time," while the user is using their device in a routine manner. Such real time providing of an explicit declaration is distinguished from a training routine, where one or more questions and/or choices may be posed to the user to answer. In contrast, an explicit declaration is provided by a user without prompting by the user device.

An explicit declaration may provide a rating or a review of a thing (e.g., "Remember that I really didn't like the food at the Baja Beach House"), may identify a thing of interest (or not of interest) to the user, and/or may provide other information that the user may want to be used to influence and thereby personalize subsequent recommendations.

In an embodiment, when making an explicit declaration, a user may address the explicit declaration to the user device, such as by beginning the explicit declaration with a digital personal assistant identifier/name (e.g., "Assistant, remember that . . . "). In this manner, the user device may recognize that an explicit declaration is being provided. However, this is not required in all embodiments. In another embodiment, the user device may be configured to receive explicit declarations from the user even if the explicit declaration is not addressed to a digital personal assistant. For instance, the user may make a statement to a friend that is overheard by the user device, and the user device may recognize and process the statement as an explicit declaration. In such an embodiment, the user may be required to "opt-in" so that the user device is enabled to listen in and process explicit declarations in this manner.

For instance, the user may provide an explicit declaration to a search engine with words that indicate that a recommendation system should remember it for subsequent application, such as by stating "Remember that Sophie says I should try Thai Tom restaurant" (i.e., telling the recommendation system to remember a recommendation received from another person regarding a thing), "Remember that I would like to check out a London museum sometime" (e.g., telling the recommendation system to remind the user about a thing based on the user's own observation or thought), etc.

Accordingly, one or more explicit declarations may be received from a user, and may be converted into rules or other form that may be processed to generate recommendations for the user. For instance, one or more environmental triggers may occur, such as a time, a location of the user, the presence of one or more persons with the user, and/or an activity of the user. The occurrence of a particular environmental trigger may cause a corresponding recommendation to be generated and provided to the user.

Recommendations may be provided to a user based on explicit declarations in any suitable environment. For instance, FIG. 1 shows a block diagram of a communication system 100, according to an example embodiment. In system 100, a user may interact with a first user device 102 to provide explicit declarations and receive recommendations based thereon. As shown in FIG. 1, system 100 includes first user device 102, a back end server 104, a first server 106*a*, a second server 106*b*, a and a second user device 108. Furthermore, first user device 102 includes a user interface 122 and an on-device personal electronic assistant 112, which includes an explicit signal-enabled recommendation system 114. Still further, back end server 104 includes a network-based assistant service 120, first server 106*a* includes a third party service 116, and second server 106*b* includes a third party service 118. The features of system 100 are described as follows.

First user device 102 and second user device 108 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™ etc.), or other type of mobile device (e.g., an automobile), or a stationary computing device such as a desktop computer or PC (personal computer). Still further, first user device 102 and second user device 108 may each be a portable media player, a stationary or handheld gaming console, a personal navigation assistant, a camera, or other type of stationary or mobile device. Although first and second user devices 102 and 108 are shown in FIG. 1, in other embodiments, other numbers of user devices may be present in system 100, including tens, hundreds, thousands, and millions of user devices.

Back end server 104, first server 106a, and second server 106b may each be formed of one or more computing devices capable of serving information. Fewer numbers or greater numbers of servers than shown in FIG. 1 may be present in system 100 in embodiments.

Each of user devices 102 and 108, and servers 104, 106a, and 106b may include a network interface that enables communications over network 110. Such a network interface may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 110 include a local area network (LAN), a wide area network (WAN), a personal area network (PAN), and/or a combination of communication networks, such as the Internet.

User interface 122 enables a user to submit questions, commands, or other verbal and/or non-verbal input and delivers responses to such input to the user. In one embodiment, the input may comprise user speech that is captured by one or more microphones of user device 102, although this example is not intended to be limiting and user input may be provided in other ways as well (e.g., textually, etc.). The responses generated by electronic personal assistant 112 may be made visible to the user in the form of text, images, or other visual content shown by user interface 122 on a display of user device 102 (e.g., within a graphical user interface). The responses may also comprise computer-generated speech or other audio content that is played back via one or more speakers of user device 102. Still further, the responses (visual content and/or audio content) may also be provided to the user via a display, one or more speakers, and/or other user interface output device that is/are physically separate from user device 102, but communicatively coupled with user device 102 (e.g., by a WiFi or WLAN interface, a USB interface, a cellular network interface, a Bluetooth™ interface, a near field communication (NFC) interface, a MirrorLink™ interface, a Miracast™ interface, etc.).

Electronic personal assistant 112 is an application (e.g., one or more computer programs that execute in processor(s) of user device 102) that a user can interact with through user interface 122 of user device 102. Electronic personal assistant 112 is configured to provide general assistance to a user by handling requests provided by the user, such as requests to perform tasks and/or services. For instance, in embodiments, electronic personal assistant 112 may be configured to answer questions, make recommendations, and/or perform actions.

Electronic personal assistant 112 may be fully contained in user device 102, or may further include a network/cloud-based back end to handle requests and/or to delegate requests to a set of web services. An example of such a back end service is shown included in back end server 104 as network-based assistant service 120. Network-based assistant service 120 may be a back-end portion of an electronic personal assistant service that includes both on-device electronic personal assistant 112 and network-based assistant service 120. Network-based assistant service 120 may enable further processing/reasoning to be performed with regard to providing assistance to users. Furthermore, network-based assistant service 120 may interact with services at one or more services, such as third party service 116 at first server 106a and third party service 118 at second server 106b, to retrieve information, to delegate information processing, etc., that may be used to assist electronic personal assistant 112 to provide assistance to users. Alternatively, electronic personal assistant 112 may access services such as third party services 116 and 118 directly (as indicated by dotted arrows in FIG. 1).

As such, electronic personal assistant 112 (with or without network-based assistant service 120) may be an electronic personal assistant, a search engine, or other system configured to provide general user assistance. Examples of commercially available search engines that are applicable to electronic personal assistant 112 include Microsoft® Bing™ (at http://www.bing.com) and Google™ (at http://www.google.com). Examples of commercially available electronic personal assistants that are applicable to electronic personal assistant 112 include Siri® developed by Apple Inc. of Cupertino, Calif., and Google Now™ developed of Mountain View, Calif.

In embodiments, electronic personal assistant 112 may handle the user requests based on user input as well as based on features such as location awareness and the ability to access information from a variety of sources including online sources (such as weather or traffic conditions, news, stock prices, user schedules, retail prices, etc.). Examples of tasks that may be performed by electronic personal assistant 112 on behalf of a user may include, but are not limited to, placing a phone call to a user-specified person, launching a user-specified application, sending a user-specified e-mail or text message to a user-specified recipient, playing user-specified music, scheduling a meeting or other event on a user calendar, obtaining directions to a user-specified location, obtaining a score associated with a user-specified sporting event, posting user-specified content to a social media web site or microblogging service, recording user-specified reminders or notes, obtaining a weather report, obtaining the current time, setting an alarm at a user-specified time, obtaining a stock price for a user-specified company, finding a nearby commercial establishment, performing an Internet search, or the like. Electronic personal assistant 112 may use any of a variety of artificial intelligence techniques to improve its performance over time through continued interaction with the user. In some embodiments, electronic personal assistant 112 may also be referred to as a search engine, a digital personal assistant, an intelligent personal assistant, an intelligent software assistant, a virtual personal assistant, or the like.

As shown in FIG. 1, electronic personal assistant 112 includes explicit signal-enabled recommendation system 114. Explicit signal-enabled recommendation system 114 enables electronic personal assistant 112 to receive explicit declarations from a user and generate recommendations for the user that are based in part on the explicit declarations.

Note that in an embodiment, a portion of explicit signal-enabled recommendation system 114 may be included in network-based assistant service 120 at back end server 104. As such, network-based assistant service 120 may enable further reasoning to be performed with regard to explicit declarations, to be used to generate recommendations for the user. For instance, network-based assistant service 120 may provide increased processing/computing power relative to user device 102, may provide search engine capability, may provide an increased understanding of the user by maintaining or accessing social network information or other profile information for the user (e.g., at one or both of third party services 116 and/or 118), and/or by providing other functionality.

For instance, third party service 116 at server 106a may optionally be present, and may be a social network that maintains social network information including a social network profile for the user. Electronic personal assistant 112 and/or network-based assistant service 120 may access the social network profile information through network 110. The social network information may be used by electronic personal assistant 112 and/or network-based assistant service 120 in addition to an explicit declaration to generate a recommendation for the user.

Third party service 118 at server 106a may also optionally be present (as well as further third party optional services), and may generate and/or store information that may be used with explicit declaration 124 by electronic personal assistant 112 and/or network-based assistant service 120 to assist in generating a recommendation for the user. For example, third party service 118 may be a restaurant recommendation service, a travel recommendation website, a product recommendation website, or other site or service that maintains user profile information, makes recommendations, and/or stores or generates relevant information regarding the user.

Figure 2:
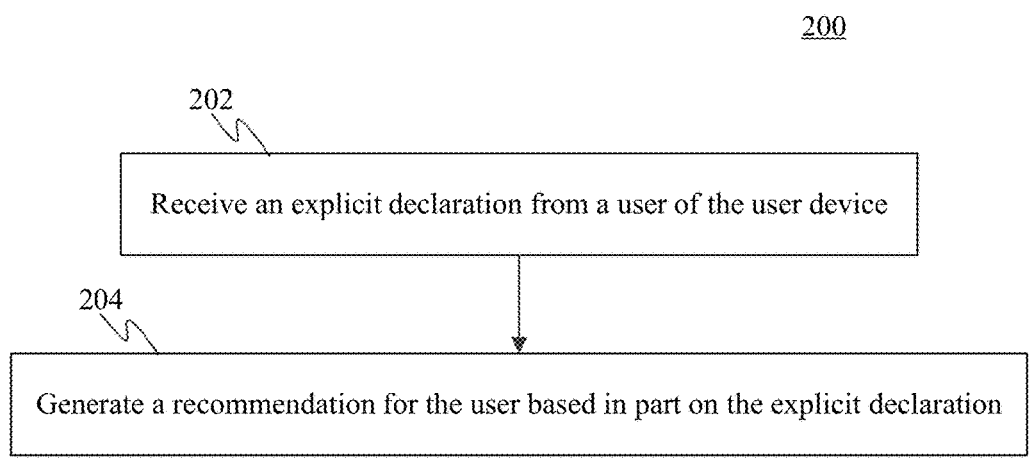
FIG. 2 shows a flowchart providing a process to generate a recommendation for a user based on an explicit declaration, according to an example embodiment.

In an embodiment, explicit signal-enabled recommendation system 114 may operate according to FIG. 2. FIG. 2 shows a flowchart 200 providing a process in a user device to generate a recommendation for a user based on an explicit declaration, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, an explicit declaration is received from a user of the user device. For example, with reference to FIG. 1, a user may be enabled to provide an explicit declaration 124 to explicit signal-enabled recommendation system 114 by interacting with user interface 122. The user may speak into a microphone of user interface 122 to provide explicit declaration 124, or may provide explicit declaration 124 textually or in another manner. Explicit declaration 124 may be provided as a series of words or in another manner, and is provided by the user with the intent to influence a subsequent recommendation. Explicit declaration 124 is received by explicit signal-enabled recommendation system 114 through user interface 122.

For instance, in one illustrative example of explicit declaration 124, the user may say "Assistant, remind me to check out the Soho neighborhood sometime." Through this explicit declaration, the user is indicating their intention for electronic personal assistant 112, which is addressed as "Assistant" by the user in this example, to provide them with a future recommendation with respect to the Soho neighborhood. The words "remind me," "remember," or similar words directed to the Assistant indicate the user's intention for the Assistant to record this explicit declaration for a future recommendation.

In step 204, a recommendation is generated for the user based in part on the explicit declaration. Explicit signal-enabled recommendation system 114 of electronic personal assistant 112 (optionally in conjunction with network-based assistant service 120) is configured to generate a recommendation for the user based at least on explicit declaration 124. The recommendation may further be generated based on inferred information regarding the user, user profile information regarding the user, and/or based on other information related to the user, as well as one or more environmental triggers. As shown in FIG. 1, user interface 122 may provide a recommendation 126 generated by explicit signal-enabled recommendation system 114 to the user. Recommendation 126 may be provided in the form of speech or other audio played from one or more speakers of user interface 122, may be displayed as text in user interface 122, or may be provided to the user in another manner by user interface 122.

Continuing the above illustrative example, recommendation 126 may be played to the user as "Hello Sophie, you are now near the Soho neighborhood that you wanted to check out—you should try Mexican food at La Esquina." In another example, recommendation 126 may be provided to the user as a displayed list, such as:

Hello Sophie!
You wanted to check out Soho, which is nearby. Here are some Soho restaurants to try:
 La Esquina
 Dos Caminos Soho In such an example, the user may be enabled to select a listed recommended restaurant to be displayed a location of the restaurant (and optionally a route to the restaurant).

In these example recommendations, the Assistant is indicating to the user ("Sophie", in this example) a recommendation to try a restaurant in the Soho neighborhood, based at least on the explicit declaration provided to the Assistant by the user. This recommendation may have been triggered based on one or more environmental triggers, such as a location of the user (e.g., being near the Soho neighborhood), a time (e.g., being near meal time), etc. In one example, once it was determined that the user was near the Soho neighborhood, a search engine query may be triggered for a restaurant to recommend in the Soho neighborhood. Accordingly, in an embodiment, the generation of a recommendation may include the issuing of a query to generate one or more items to be included in the recommendation. The search query that resulted in one or more restaurants being recommended may have had any suitable form such as being a multi-word query for Soho attractions (e.g., "Soho tourist attractions"), a query for Soho restaurants (e.g., "Soho restaurants"), a query for a type of restaurant favored by Sophie based on her profile ("Soho Mexican restaurants"), etc.

Note that in the embodiment of FIG. 1, recommendation 126 is provided to the user by the same user device (user device 102) to which explicit declaration 124 was provided. Note that in another embodiment, recommendation 126 may be provided to the user by a different device than the device to which explicit declaration 124 was provided.

Accordingly, in embodiments, a user may be enabled to provide an explicit declaration, and a subsequent recommendation may be generated for the user based at least in part on the explicit declaration. Further details of these and further embodiments are provided in the following sections. For instance, Section II, which follows this section, describes exemplary methods and systems for providing explicit declarations and generating recommendations. Section III describes exemplary mobile and desktop computing devices that may be used to implement embodiments described herein. Section IV provides some concluding remarks.

Figure 3:
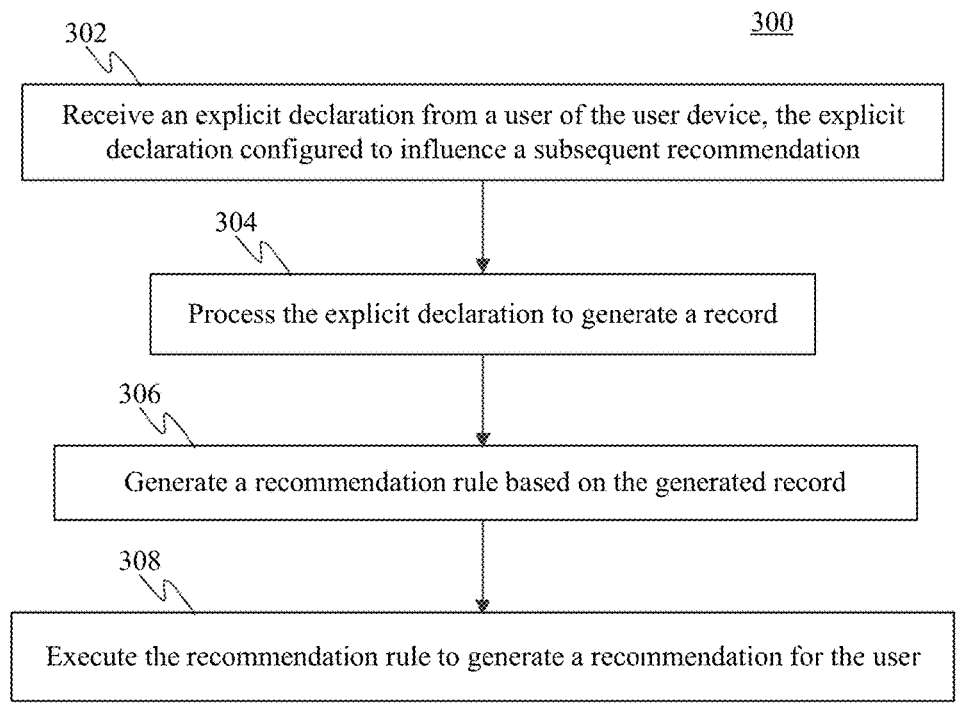
FIG. 3 shows a flowchart providing an example implementation of the flowchart of FIG. 2, according to an embodiment.
Figure 4:
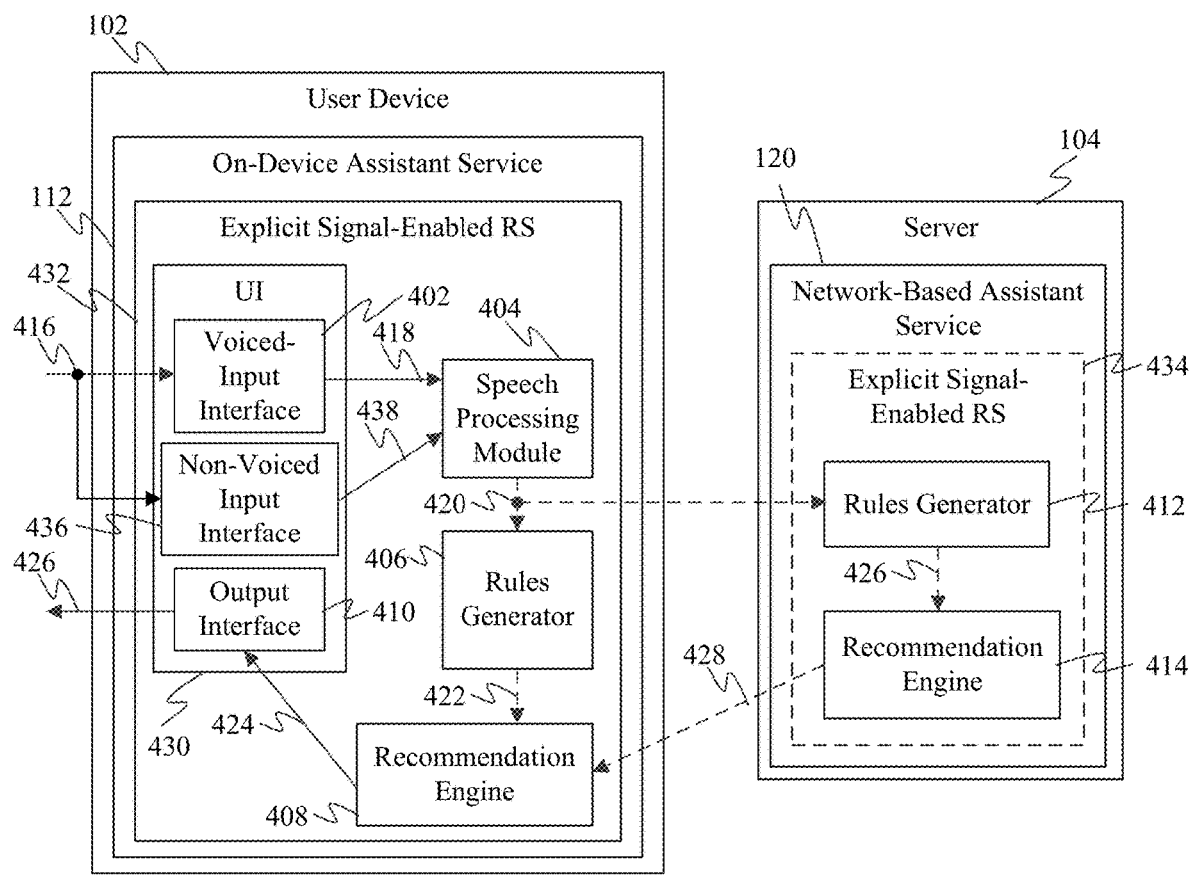
FIG. 4 shows a block diagram of user device that optionally communicates with a server to generate a recommendation for a user based on an explicit declaration, according to an example embodiment.

II. Example Embodiments for Providing Explicit Declarations and Generating Recommendations As described above, explicit signal-enabled recommendation system 114 may be configured in various ways to enable explicit declarations to be provided and to generate recommendations. For instance, FIG. 3 shows a flowchart 300 providing a process to generate a recommendation based on an explicit declaration, according to an embodiment. Explicit signal-enabled recommendation system 114 may operate according to flowchart 300, in an embodiment. Flowchart 300 is described as follows with respect to FIG. 4. FIG. 4 shows a block diagram of user device 102 and server 104 of FIG. 1 configured to generate a recommendation for a user based on an explicit declaration, according to an example embodiment. As shown in FIG. 4, user device 102 includes on-device assistant service 112, which includes an explicit signal-enabled recommendation system (RS) 432. Explicit signal-enabled RS 432 is an example of explicit signal-enabled RS 114. Explicit signal-enabled RS 432 includes a speech processing module 404, a rules generator 406, a recommendation engine 408, and a UI (user interface) 430. Server 104 includes network-based assistant service 120, which includes an explicit signal enabled RS 434. Explicit signal-enabled RS 434 includes a rules generator 412 and a recommendation engine 414.

Explicit signal-enabled RS 434 at server 104 and explicit signal-enabled RS 432 of user device 102 may form a combined explicit signal-enabled RS, or may be separate from each other. Explicit signal-enabled RS 434 and explicit signal-enabled RS 432 do not need to both be present in all embodiments.

Note that in one embodiment, flowchart 300 may be entirely performed in user device 102. In another embodiment, user device 102 and server 104 may each perform portions of flowchart 300. Further structural and operational embodiments will be apparent to persons skilled in the relevant art(s) based on the following description.

Flowchart 300 of FIG. 3 begins with step 302. In step 302, an explicit declaration is received from a user of the user device, the explicit declaration configured to influence a subsequent recommendation. With reference to FIG. 4, a user may be enabled to provide an explicit declaration 416 to explicit signal-enabled RS 432 by interacting with a voiced-input interface 402 provided by UI 430. UI 430 is an example of user interface 122 of FIG. 1, and in an embodiment, voiced-input interface 402 includes a microphone and circuitry configured to receive explicit declaration 416 in the form of speech. In another embodiment, UI 430 may include a non-voiced input interface 436, which may include a text entry interface, a push-button (e.g., physical and/or virtual buttons), and/or other interface, to receive explicit declaration 416 in another form. Explicit declaration 416 may be provided as a series of words or in other form, and is provided by the user with the intent to influence a subsequent recommendation. Explicit declaration 416 may be received from voiced-input interface 402 of UI 430 by speech processing module 404 as series of words 418. Series of words 418 may be provided in the form of recorded speech or other form providing spoken words. Alternatively, explicit declaration 416 may be received by speech processing module 404 from non-voiced interface 436 of UI 430 as non-verbal declaration indication 438. Non-verbal declaration indication 438 may be provided in the form of text, data indicated by button selection, or other form, depending on how explicit declaration 416 is received from the user by non-voiced interface 436.

In step 304, the explicit declaration is processed to generate a record. For instance, in an embodiment, speech processing module 404 is configured to process series of words 418 to generate a record 420. Record 420 is representative of explicit declaration 416, and may optionally be stored in storage (not shown in FIG. 4). For instance, record 420 may include one or more of the contents of series of words 418, a time at which explicit declaration 416 was received, a location at which explicit declaration 416 was received, and any information generated by speech processing module 404 by processing series of words 418 (e.g., a location identified in series of words 418, a person identified in series of words 418, a time identified in series of words 418, a context identified for series of words 418, and/or an affinity identified in series of words 418). Series of words 418 may be processed in any manner, including using speech recognition (if provided explicit declaration 416 is provided in the form of speech), by the parsing of series of words 418 to perform key feature extraction, as well as performing or applying natural language processing, machine learning, artificial intelligence, and/or other processes to derive a meaning of explicit declaration 416.

Figure 5:
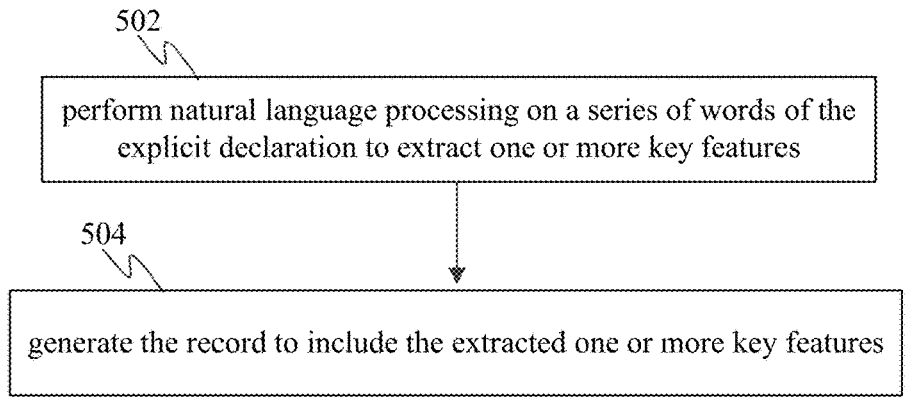
FIG. 5 shows a flowchart providing a process for processing a received explicit declaration to generate a record, according to an example embodiment.
Figure 6:
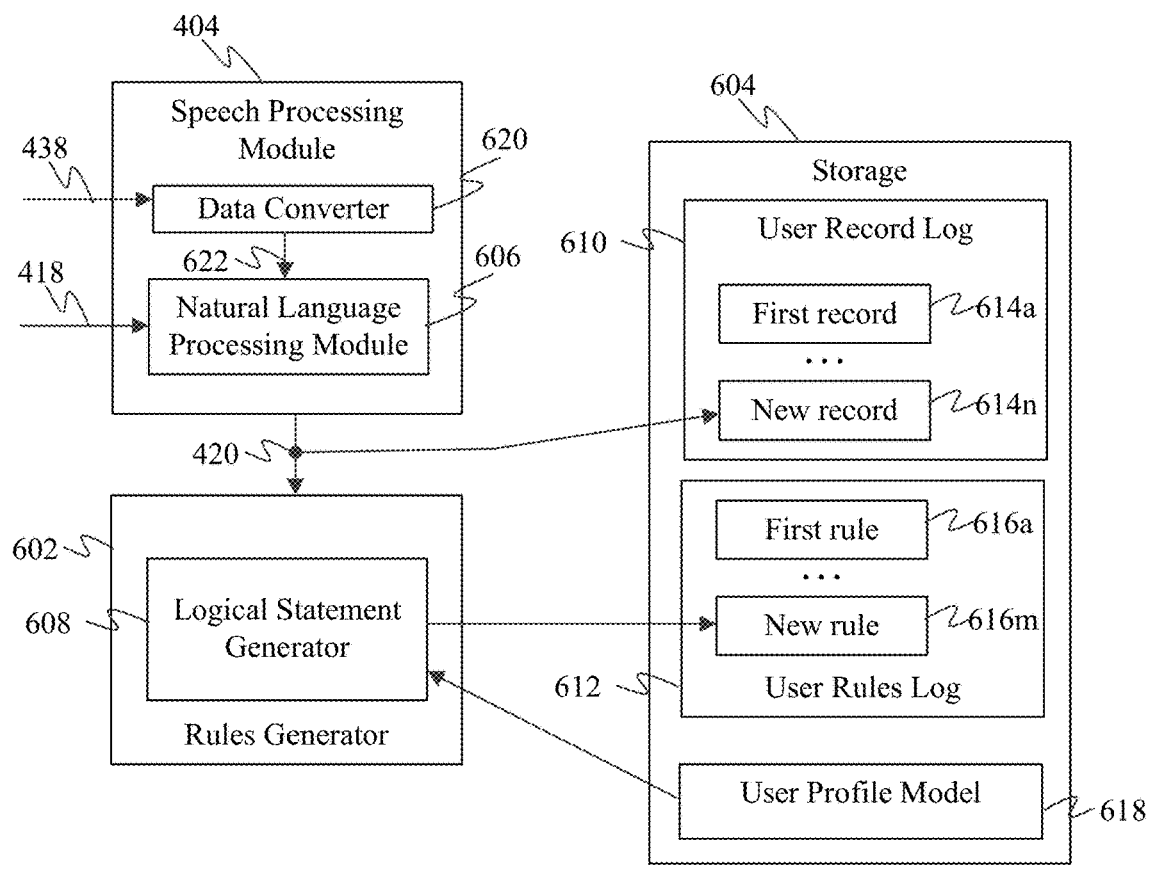
FIG. 6 shows a block diagram of a system used to process a received explicit declaration to generator records and rules, according to an example embodiment.

For example, in an embodiment, step 304 may be performed according to FIG. 5. FIG. 5 shows a flowchart 500 for processing a received explicit declaration to generate a record, according to an example embodiment. For illustrative purposes, flowchart 500 is described with reference to FIG. 6. FIG. 6 shows a block diagram of speech processing module 404 and rules generator 602 in association with a storage 604, according to an example embodiment. Further structural and operational embodiments will be apparent to persons skilled in the relevant art(s) based on the following description.

Flowchart 500 begins with step 502. In step 502, natural language processing is performed on the series of words of the explicit declaration to extract one or more key features. For instance, as shown in FIG. 6, speech processing module 404 may optionally include a data converter 620. Data converter 620 is configured to receive non-verbal declaration indication 438 (when present). As described above, non-verbal declaration indication 438 may indicate an explicit declaration provided in the form of text, as data indicated by button selection, or indicated in another form. Data converter 620 may be configured to convert non-verbal declaration indication 438 into one or more words (e.g., similar to series of words 418), which is output by data converter 620 as converted non-verbal declaration 622. In this manner, an explicit declaration provided in the form of button pushes, etc., can be converted into words that can be processed by speech processing module 404 for meaning. For example, a button labeled as "Remember that" (or similarly labeled) that is followed by a search results string, a recommendation provided by another person, etc., data converter 620 may generate converted non-verbal declaration 622 to include a string that includes the words "Remember that" (or other label) combined with the search results string, recommendation text, etc.

It is noted that when non-verbal declaration indication 438 indicates an explicit declaration received from the user in the form of text (e.g., typed into a text entry box, or otherwise received as text from the user), data converter 620 may not be necessary (and non-verbal declaration indication 438 may be provided to natural language processing module 606 for processing as described below).

Examples of non-verbal explicit declarations that may be provided by a user and received in non-verbal declaration indication 438 include indications of where a user clicked on a physical or virtual button to provide an explicit declaration (e.g., by clicking a Facebook® "like" button on an entity, rating a restaurant highly on a restaurant review website such as Yelp!® at www.yelp.com, indicating something as a favorite, etc.). In such case, metadata associated with the click or button push may be provided in non-verbal declaration indication 438. In an example case, a user may be provided with a recommendation by another person, and the user may interact with UI 430 to accept the recommendation. For instance, Sophie may share a recommendation with Anna, and Anna may receive the recommendation from Sophie in a message (e.g., an email, a text message, an instant message, a social network message, etc.). Anna may be enabled by UI 430 to merely say the word "accept" or press a virtual button labeled "accept" to provide her explicit declaration that she wants her Assistant (e.g., on-device assistant service 112) to remember the recommendation from Sophie. In another embodiment, Anna's Assistant may be enabled to silently accept Sophie's recommendation when it is received from Sophie on Anna's behalf. For instance, Anna's Assistant may detect the recommendation in the message received from Anna. The silent acceptance by Anna's Assistant may be enabled based on a previous conclusion that Anna is likely to trust Sophie, that Anna has proactively indicated (e.g., in UI 430) that she wants to automatically accept Sophie's recommendations, etc.

Furthermore, speech processing module 404 may include a natural language processing module 606 that is configured to perform natural language processing (NLP) on series of words 418 (and/or on converted non-verbal declaration 622). In an embodiment, the natural language processing may extract key features from series of words 418 and/or converted non-verbal declaration 622 by one or more of generating a parse tree, performing word sense disambiguation, performing named-entity recognition, performing natural language understanding, etc. Key features such as location words (or "tokens"), person-related words, time-related words, words expressing affinities, and/or context-related words may be extracted therefrom.

For example, in an embodiment, NLP module 606 may perform parsing on series of words 418 and/or converted non-verbal declaration 622 to extract one or more words categorized in one or more of the key feature types listed in Table 1 below:

TABLE 1

| Location | Time | Person(s) | Context | Affinities |
| --- | --- | --- | --- | --- |
| City or named geographic location | Specific Date/ Time | Anonymous | People (e.g., personalization, timing) | Food |
| Area (e.g., neighborhood) | Event Sphere (happy hour, etc.) | Crowd | Recent Events | Activities |
| Proper Place (e.g., a specific museum, a specific restaurant) | Arbitrary Future (to be checked out at some arbitrary future time) | Social Network | Calendar | Stores/ Shopping |
| Derived Place (e.g., coordinate at where the user is at a time) | Negotiated/ Scheduled (an indicated future time) | Friends | Location | Travel |
| | Milestones (e.g., birthday, anniversary, etc.) | Authorities | Resources (e.g., time, money) | Long Decisions (e.g., research for buying a car or a house, moving to a new city) |
| | | Similars (persons with similar tastes or preferences as the user) | Environment (weather, safety) | |
| | | | Health (e.g., life stage) | |

In Table 1, each column is directed to a particular feature type category—location, time, people, context, and affinities. Furthermore, each feature type category may have one or more sub-categories, non-exhaustive examples of which are shown in the corresponding columns of Table 1.

Thus, NLP module 606 may categorize one or more words of series of words 418 and/or converted non-verbal declaration 622 into these and/or other feature type categories. This categorization may be used by NLP module 606 to perform natural language understanding of series of words 418 and/or converted non-verbal declaration 622. Note that, however, the categories of Table 1 are provided for purposes of illustration, and are not intended to be limiting. NLP module 606 may categorize words into any types of categories, including those categories provided in Table 1, and/or any other categories that are otherwise known and/or may be apparent to persons skilled in the relevant art(s). Any particular word or series of words may be categorized by NLP module 606 into any numbers of categories, including a single category, or multiple categories. In embodiments, a recommendation may be formed based on words/data categorized into any number of categories.

Referring back to FIG. 5, in step 504, the record is generated to include the extracted one or more key features. For instance, as shown in FIG. 6, speech processing module 404 generates record 420 corresponding to a received explicit declaration. As shown in FIG. 6, record 420 may be stored in storage 604 in a user record log 610 as a new record 614n. Information that indicates the natural language understanding of series of words 418 and/or converted non-verbal declaration 622 may be stored in new record 614a with the extracted key features, including the information described above with respect to record 420 (FIG. 4). User record log 610 is a log of records generated based on explicit declarations provided by the user. As shown in FIG. 6, the user may have records 614a-614n stored in user record log 610, corresponding to a number "n" of explicit declarations received from the user. As described further below with respect to rules generator 602, one or more rules may be generated based on each of records 614a-614n to be used to generate recommendations for the user.

In one illustrative example of flowchart 500, a first person named Anna (the user) may be talking to her friend Sophie (a second person). Sophie may mention an amazing new restaurant ("Thai Tom") to Anna that she says Anna has to try. Anna may pull out her smart phone (e.g., user device 102), activate her electronic personal assistant, and say "Assistant, remember that Sophie says I should try Thai Tom." The electronic personal assistant may respond "Got it," or may provide another confirmation of receiving the explicit declaration.

Accordingly, NLP module 606 of speech processing module 404 may perform natural language processing of this received explicit declaration to parse key features such as "remember" (an indication of an intent for the Assistant to use this statement as an explicit declaration for a future recommendation), "Sophie" as a second person, "I should try" as indicating Sophie provided a recommendation to the user, and "Thai Tom" as the recommended location for Sophie to try. This information may be indicated in a record, such as record 614n, in any manner. For example, record 614n may be stored as a data structure with attributes and values corresponding to the key features category names and key feature values, as well as storing any additional information regarding the explicit declaration mentioned elsewhere herein.

Referring back to FIG. 4, note that although speech processing module 404 is shown being located in user device 102, in another embodiment, some or all speech processing of received explicit declarations may instead be performed at server 104.

Referring back to flowchart 300 in FIG. 3, in step 306, a recommendation rule is generated based on the generated record. For example, as shown in FIG. 4, rules generator 406 and recommendation engine 408 may be included in explicit signal-enabled RS 432 (user device 102), and rules generator 412 and recommendation engine 414 may be included in explicit signal-enabled RS 434 (server 104), depending on the particular implementation. For instance, if user device 102 has sufficient processing power, and access to the appropriate data resources, rules generator 406 and recommendation engine 408 may process records to generate rules and recommendations based on records of explicit declarations. In another embodiment, it may be desired to use rules generator 412 and recommendation engine 414 at server 104 to generate rules and/or recommendation based on records of explicit declarations because greater processing capacity may be available at server 104, because desired data resources may be more easily accessed at server 104, and/or for other reasons. In embodiments, any combination of rules generator 406, recommendation engine 408, rules generator 412, and recommendation engine 414 may be used to generate rules and/or recommendations as described herein.

Depending on the particular embodiment, rules generator 406 and/or rules generator 412 may receive record 420. Rules generator 406 and/or rules generator 412 may be configured to generate one or more recommendation rules based on record 420. Each recommendation rule defines when and how a corresponding recommendations is provided. The recommendation rules may have any desired format. For example, rules generator 406 and/or rules generator 412 may generate logic based rules using operators such as OR, XOR, AND, ELSE, NOT, IF-THEN, etc, and/or may generate recommendation rules in other formats. As shown in FIG. 4, rules generator 406 (user device 102) may generate a recommendation rule 422 based on record 420, and rules generator 412 (server 104) may generate a recommendation rule 426 based on record 420.

For illustrative purposes, rules generator 406 and rules generator 412 are described in further detail with respect to FIG. 6. FIG. 6 shows a rules generator 602 that is an example embodiment of rules generator 406 and of rules generator 412. Rules generator 602 is configured to generate one or more recommendation rules based on record 420. As shown in FIG. 6, in an embodiment, rules generator 602 may include a logical statement generator 608. Logical statement generator 608 is configured to receive record 420, and generate one or more corresponding rules (e.g., logical expressions or statements) based on logical operators, such as IF-THEN rules, etc. For purposes of illustration, IF-THEN rules are shown in examples as follows, although in embodiments any format of rules may be used. Each IF-THEN rule has a format of IF<first logical expression>THEN<second logical expression>. The first logical expression defines the conditions for matching the rule, and the second logical expression defines what action is performed when the rule is matched according to the first logical expression.

As shown in FIG. 6, logical statement generator 608 is configured to store generated rules in storage 604. For example, logical statement generator 608 stores a new rule 616m corresponding to record 412 in storage 604. Rules that are generated for the user may be stored in a user rules log 612 corresponding to the user. As shown in FIG. 6, user rules log 612 includes first-mth rules 616a-616m. First-mth rules 616a-616m may include one or more rules corresponding to each of records 614a-614n.

Referring to the above example of Sophie providing a recommendation of "Thai Tom" to Anna, logical statement generator 608 may generate the following recommendation rule:

IF<user requests restaurant>THEN<recommend restaurant "Thai Tom">

In this example, if Anna asks her digital personal assistant to recommend a restaurant to her, the above IF logical statement is matched. Accordingly, the recommendation of the restaurant "Thai Tom" will be provided to her per the THEN logical statement.

Note that IF-THEN statements of any complexity may be generated by logical statement generator 608, such that the first logical statement may have more than one condition to be satisfied, and the second logical statement may provide more than one recommendation action. For example, referring to the above example of Sophie providing a recommendation of "Thai Tom" to Anna, Anna may have a preference indicated in a user profile model 618 for only being recommended restaurants within 10 miles of her current location. Accordingly, logical statement generator 608 may generate the following recommendation rule:

IF<user requests restaurant AND restaurant "Thai Tom" is within 10 miles of current location>THEN<recommend restaurant "Thai Tom">

In this example, if Anna asks her digital personal assistant to recommend a restaurant to her and Anna is located within 10 miles of restaurant "Thai Tom" (as determined by a location determiner of user device 102, such as a GPS module, etc.), the recommendation of the restaurant "Thai Tom" will be provided to her. Otherwise, Anna will not be provided with the recommendation.

Note that user profile model 618 shown stored in storage 604 contains a collection of personal data associated with the user (including her restaurant distance preference) Each user may have a corresponding user profile model. User profile model 618 may indicate information that is descriptive of a user, such as the user's name and age, interests, skills and knowledge, preferences, dislikes, etc. The information included in user profile model 618 may be provided proactively by the user (e.g., by training), or may be determined implicitly, by tracking behavior of the user in visiting websites, interacting with pages, interacting with other users, etc. A user may be enabled to opt-in and opt-out from having some or all aspects of user profile model 618 being maintained for the user. User profile model 618 may be static or may be dynamic. User profile model 618 may incorporate social network information for the user (e.g., an indication of friends, family members, liked entities, etc.).

User profile model 618 may be stored and/or represented in any format. In an embodiment, user profile model 618 may be represented as a graph for a user. Nodes of the graph may represent entities with which the user has relationships (e.g., persons, places, objects, etc.) and each node may have a weight indicating the strength of the relationship with the user (e.g., liked or disliked). Weighted lines may be connected between the nodes that indicate the strength of the relationships between the different nodes. Alternatively, user profile model 618 may be represented in other ways.

Storage 604 (and user profile model 618, when present) may be located in user device 102, back end server 104, OR another server (e.g., server 106a, server 106b, etc.), or may be distributed across multiple devices and/or servers. Storage 604 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Referring back to flowchart 300 in FIG. 3, in step 308, the recommendation rule is executed to generate a recommendation for the user. For example, as shown in FIG. 4, recommendation engine 408 (user device 102) may receive recommendation rule 422 from rules generator 406 and/or recommendation engine 414 (server 104) may receive recommendation rule 426 generated by rules generator 412. Recommendation engine 408 and/or recommendation engine 414 may execute recommendation rule 422 and/or 426 to provide a recommendation to the user.

For example, when recommendation engine 408 (user device 102) executes recommendation rule 422, recommendation engine 408 may generate a recommendation 424. Recommendation 424 is provided to UI 430 to be provided to the user by an output interface 430 of UI 430 as provided recommendation 426. Output interface 430 may be a speaker that plays provided recommendation 426 in the form of speech or other audio, may be a graphical user interface (GUI) that displays provided recommendation 426 in the form or text or graphics, or may have another form used to provide provided recommendation 426 to the user.

Alternatively, when recommendation engine 414 (server 104) executes recommendation rule 426, recommendation engine 414 may generate a recommendation 428 that is transmitted to user device 102. Recommendation 428 may be provided to output interface 410 as recommendation 424 by recommendation engine 408, to be provided to the user as provided recommendation 426, or may be provided to the user in another manner.

Figure 7:
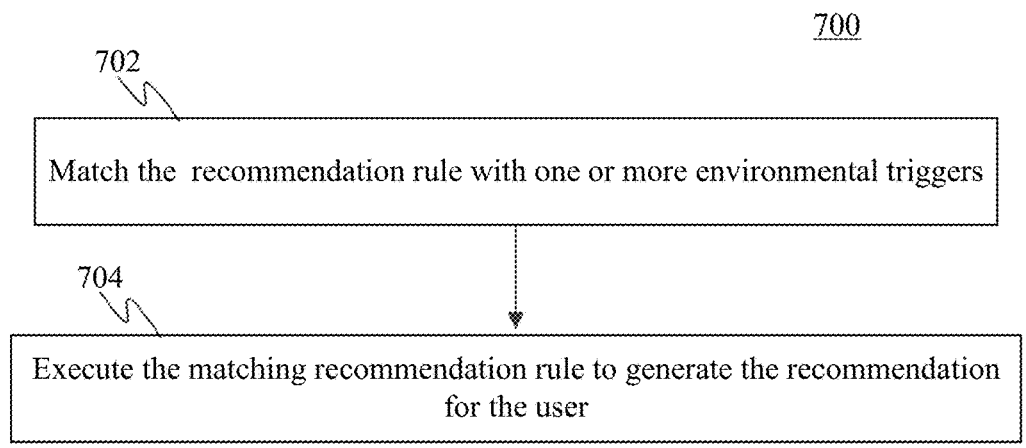
FIG. 7 shows a flowchart providing a process for executing recommendation rules to generate a recommendation for a user, according to an example embodiment.
Figure 8:
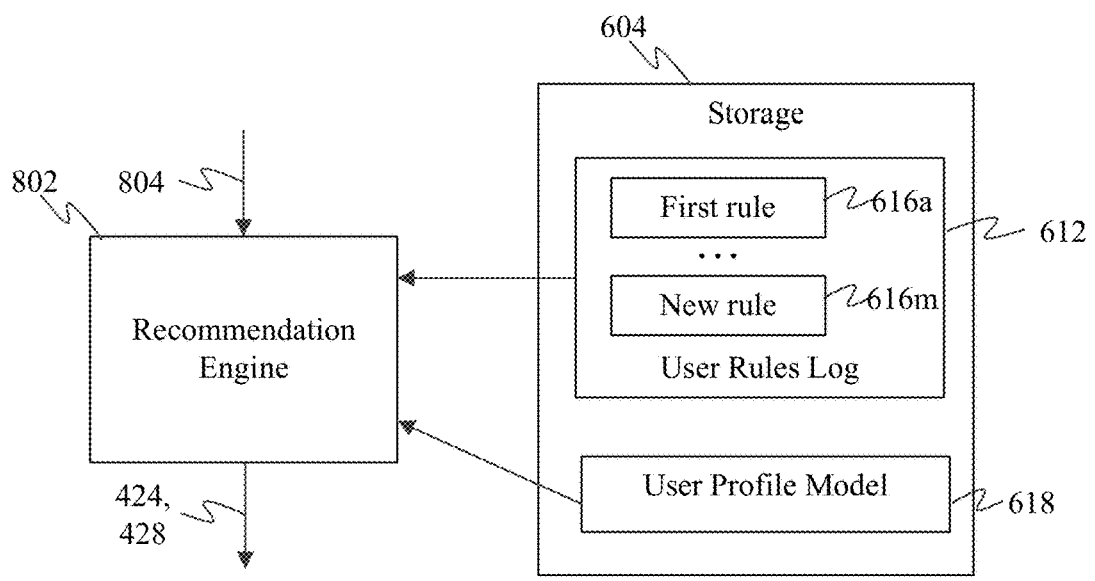
FIG. 8 shows a block diagram of a recommendation engine that receives recommendation rules to generate recommendations for a user, according to an example embodiment.

Recommendation engine 408 and/or recommendation engine 414 may execute a recommendation rule in any manner in step 308. For instance, FIG. 7 shows a flowchart 700 providing a process for executing recommendation rules to generate a recommendation for a user, according to an example embodiment. For illustrative purposes, flowchart 700 is described with reference to FIG. 8. FIG. 8 shows a block diagram of a recommendation engine 802 that receives recommendation rules to generate recommendations for a user, according to an example embodiment. Recommendation engine 802 is an example of recommendation engine 408 and of recommendation engine 414. Further structural and operational embodiments will be apparent to persons skilled in the relevant art(s) based on the following description.

Flowchart 700 begins with step 702. In step 702, the recommendation rule is matched with one or more environmental triggers. For example, recommendation engine 802 may receive one or more environmental triggers 804. Environmental trigger(s) 804 may include one or more of a current time, a future time, a current location, a future location (e.g., a predicted or known/planned future location), a person currently with the user, a person to be with the user in the future (e.g., a person predicted or known/planned to be with the user at a future time and/or location), an activity of the user, a signal received from an application or service, an indication by the user that the user wants a recommendation, etc. The application or service may reside on user device 102 or be remote (e.g., at second user device 108, third party service 116 at server 106a, third party service 118 at server 106b, etc.).

For instance, as described above, times, locations, and/or persons may be environmental triggers. In one example, the user Anna may meet up with Sophie, and the presence of Sophie may be an environmental trigger to Anna's recommendation system. The presence of Sophie may be detected in any manner by Anna's user device (e.g., by location determination of Sophie's own mobile device, by detecting Sophie's voice, by Anna being detected as saying "Hi Sophie" or other greeting, by Anna providing an indication on a UI of the user device, etc.). The presence of Sophie may trigger one or more recommendations for Anna around Sophie.

In another example, the user may provide the statement of "Find me a restaurant for next Saturday night." Such a statement could be used to predict a future location, such as Chicago, to be an environmental trigger for a recommendation, if the recommendation system knows that the user is planning to be in Chicago in that time frame (e.g., from the user's calendar, a prior statement made by the user, etc.). Predictions of future locations and/or persons to be with the user in the future may be determined from historical travel patterns of the user, observed plans such as calendar events, learned data from other Assistant interactions, or inherent properties of the location itself. For instance, if "Alinea" is a restaurant that only exists in Chicago, and if the user recommends Alinea as a restaurant, metadata associated with restaurant Alinea may indicate additional features such as the location. For restaurants or other businesses that have many locations (e.g., "Starbucks®"), additional information may be used to improve the prediction (e.g., other statements by the user, etc.).

According to step 702, the one or more indicated environmental triggers are compared with recommendation rules 616a-616m of user rules log 612. If a match is found with one or more of recommendation rules 616a-616m, one or more corresponding recommendations may be executed.

For instance, in an embodiment, environmental trigger(s) 804 may be compared against the IF logical statements of recommendation rules 616a-616m when recommendation rules 616a-616m are IF-THEN recommendation rules. Any of recommendation rules 616a-616m having an IF logical statement matching an environmental trigger may be selected for execution.

Continuing the above example of Sophie providing a recommendation of "Thai Tom" to Anna, Anna may be looking for a quick late night meal after class. As such, Anna may ask her electronic personal assistant, "What's a good place for dinner?" This request for a dinner recommendation may be provided as an environmental trigger 804 to recommendation engine 802. Accordingly, recommendation engine 802 may attempt to match the environmental trigger of a request for a restaurant recommendation with rules 616a-616n in user rules log 612 for the user. Recommendation engine 802 may find a match with the following recommendation rule:

IF<user requests restaurant>then<recommend restaurant "Thai Tom">

Note that the IF logical statement of this recommendation rule may include further constraints, such as a location constraint, a time constraint, etc. for a match to be made. As such, the current time, the current location, and/or other environmental triggers may be provided to recommendation engine in environmental trigger(s) 804 to be matched with rules 616a-616n along with the restaurant recommendation request.

In step 704, the recommendation rule is executed with respect to the one or more environmental triggers to generate the recommendation for the user. In an embodiment, as shown in FIG. 8, if recommendation engine 802 determines a match in step 702, recommendation 802 is configured to provide the recommendation corresponding to the matching recommendation rule as recommendation 424 or 428. Note that if multiple recommendation rules are determined to match in step 702, the matching recommendation rules may be prioritized in any manner, and provided to the user in an order determined by the prioritization. Alternatively, just the highest priority recommendation may be provided to the user.

Note that in another embodiment, in addition to, or alternatively to generating the recommendation for the user in step 704, a recommendation rule may be executed that is configured to collect additional data. Thus, rather than providing the user with a recommendation in step 704, a recommendation rule may be configured to collect additional data from the user and/or from other source (e.g., from another application or service, etc.). For example, the recommendation rule may cause a question to be posed to the user (e.g., "You are now in the Soho neighborhood that you asked me to remember and it is time to eat. What kind of food are you in the mood for?"). The answer to the question may be used to generate a recommendation for the user right after the user answers the question, after one or more further questions are posed, and/or at some other later time.

In an embodiment, when recommendation rules 616a-616m are IF-THEN recommendation rules, recommendation engine 802 may perform the action of the THEN logical statement for the matching recommendation rule(s). For instance, continuing the above example of Sophie providing a recommendation of "Thai Tom" to Anna, recommendation engine 802 may provide Anna with the restaurant "Thai Tom" as a recommendation in response to her question "what's a good place for dinner?" due to the match found with the corresponding IF logical statement (user requests restaurant).

Note that in one example, the THEN logical statement for a recommendation rule may include an action, such as an action to provide a particular query to a query processing entity such as a search engine. In the current example of Sophie and Anna, the THEN logical statement may be a query for nearby Thai food restaurants. In this manner, multiple search result suggestions may be provided in response to a match.

In another example, recommendation rules may be configured to remind users of aspects of recommendations when environmental triggers for the recommendations are known to occur in the future. For instance, a person, Bob, may tell the user to check out the Alinea restaurant for dinner the next time the user is in Chicago. Accordingly, the user may tell the Assistant "Remember that I should check out the Alinea restaurant next time I am in Chicago." A recommendation rule can be configured to remind the user during the planning of their next trip to Chicago (which may be planned for the following month) that a reservation with the restaurant Alinea should be booked (e.g., because the restaurant is known to be popular). By reminding the user to book the reservation during the planning stage for the trip, when the user actually arrives in Chicago on the trip, the reservation is already made (it is not too late to make the reservation).

In an embodiment, the multiple suggestions may be ranked based on user profile information of the user included in user profile model 618 of the user. For instance, if Sophie is valued relatively highly by Anna, as indicated in user profile model 618, Sophie's recommendation of "Thai Tom" may be ranked highly, if not on the top if a list of suggested restaurants. If Sophie is not valued highly by Anna, Sophie's recommendation of "Thai Tom" may be ranked lowly, or not included in the list of suggested restaurants at all.

Note that in embodiments, explicit actions can modify or inform other implicit signals. For instance, if Anna actioned Sophie's recommendation for the restaurant "Thai Tom" above (e.g., by going to and being detected at the location of the Thai Tom restaurant), future restaurant rankings provided to Anna may take into account Sophie's preferences. In such an embodiment, rules generator 602 and/or recommendation engine 802 may take into account Sophie's preferences when generating rules and/or recommendations. Sophie may make her preferences available to Anna, and thereby to rules generator 602, at a service (e.g., a social network or elsewhere) such as third party service 116 of FIG. 1, or at second user device 108 (which may be Sophie's user device). For instance, rules generator 602 and/or recommendation engine 802 may be enabled to access a user profile model of Sophie at one or more of these locations.

In such case, Sophie can become a marked high "influencer" for search results and recommendations provided to Anna in the future. This may also be reversed, such that because Anna actioned and/or liked Sophie's recommendation, Sophie could be provided with user profile information of Anna's to be used to modify search results and recommendations provided to Sophie.

In an embodiment, Anna may take one or more negative actions, such as going to the restaurant Sophie recommended, and then scoring the restaurant low on a review, or telling her digital personal assistant that she did not like the restaurant. Such a negative action may provide a strong negative signal to cause Sophie to be a low influencer with respect to Anna (including being a negative influencer), and/or to decrease or prevent user profile information of Anna from being provided to Sophie. Accordingly, a status of a person providing a recommendation as an influencer on the user may be adjusted to be higher or lower depending on a reaction by the user to the recommendation. For example, if the user reacts positively (e.g., actioned and/or liked a recommendation), the status of the person providing the recommendation may be moved in the direction of being a high influencer with respect to the user. If the user reacts negatively (e.g., did not action and/or indicated a dislike for a recommendation), the status of the person providing the recommendation may be moved in the direction of being a low influencer with respect to the user.

Note that in one embodiment, a second user (e.g., Sophie) may be considered as a high or low influencer across all domains (e.g., restaurants, movies, travel locations, activities, clothes or other retail items, etc.) for a first user (e.g., Anna). In another embodiment, the second user may be considered as a high or low influencer for the first user on a domain-by-domain basis. For instance, Sophie may be considered a high influencer for Anna with respect to restaurant recommendation (e.g., because they have similar taste in food), while Sophie may be considered a low influencer for Anna with respect to movie recommendations (e.g., because they do not share the same taste in movies).

In this manner, a user profile model for a user may be built to include a profile of interests and trusted influencers based on real world interactions (e.g., did the user actually put the recommendation to use or otherwise interact with the suggestion?). Accordingly, based on the modifications to the user profile model of the user, future search results and recommendations for the user may be tuned.

In an embodiment, these techniques may be extended by building chit-chat scenarios around interest categories, particularly if the digital personal assistant did not previously know these categories were interests of the user. For instance, a particular explicit declaration provided by a user may be used as a launching point for an immediate get-to-know-you question and answer session by the digital personal assistant. For example, a user may provide the following explicit declaration: "Assistant, remind me to try and see Gravity in the theater once it's out." In response, the digital personal assistant may state "Cool, I'll remind you," and may follow this with one or more question statements such as "I didn't know you were a sci-fi fan, I'll remember that. Or, do you just adore George Clooney?"

Note that in embodiments, searches and recommendations may originate across devices, and may be tuned by explicit or implicit signals received from any of the devices linked to a user.

In another embodiment, an explicit declaration does not need not be precise to a single entity (e.g., about a particular restaurant such as "Thai Tom"), but can also be more general. For example, the following explicit declaration may be provided by a user: "Assistant, remind me to check out this neighborhood some other time." This general statement of a neighborhood may be used to train the recommendation engine to suggest exploring that neighborhood on a weekend, to rank business recommendations associated with that neighborhood higher. In another embodiment, instead of a single restaurant type, a cuisine (e.g., Mexican) or chain ("McDonalds®") could be expressed. Such generalities may be used in any type of explicit declaration.

In embodiments, explicit declarations can contain multiple aspects of tuning information. For instance, the following example explicit declaration of "Assistant, remind me that Miles and I should shop at Urban Outfitters™ sometime" communicates both an affinity for a place (Urban Outfitters™) and an affinity for going to that place with a specific person (Miles). Similarly, affinities could exist to other information types such as important dates, such as in the example explicit declaration: "remind me to check out the Bounce Palace when I'm planning Luca's next birthday party."

In an embodiment, explicit declarations may be correlated with location sharing and a referral element to comprise a commerce offering. For example, Sophie may receive a discount at the "Thai Tom" restaurant next time that she goes there because she referred Anna to the restaurant ("e.g., Anna may have received a "friend of Sophie" discount when Anna checked in to the restaurant, or was tagged with a Bluetooth beacon or other proof of her presence at the restaurant).

Still further, a shared list of map favorites may be used as an alternative way of entering Anna's explicit recommendations into Sophie's digital personal assistant's notes. For example, Anna may be enabled to say "oh, I'll share you my list of favorite Chicago restaurants." When she does this, Sophie can tell her digital personal assistant to remember the whole list or pick a few that seem particularly noteworthy.

III. Example Mobile and Stationary Device Embodiments

User device 102, back end server 104, server 106a, server 106b, second user device 108, on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, recommendation engine 802, flowchart 200, flowchart 300, flowchart 500, and flowchart 700 may be implemented in hardware, or hardware combined with software and/or firmware. For example, on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, and/or recommendation engine 802, as well as one or more steps of flowchart 200, flowchart 300, flowchart 500, and/or flowchart 700 may be implemented as computer program code/instructions configured to be executed in one or more processors and stored in a computer readable storage medium. Alternatively, user device 102, back end server 104, server 106a, server 106b, second user device 108, on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, and/or recommendation engine 802, as well as one or more steps of flowchart 200, flowchart 300, flowchart 500, and/or flowchart 700 may be implemented as hardware logic/electrical circuitry.

For instance, in an embodiment, one or more, in any combination, of on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, recommendation engine 802, flowchart 200, flowchart 300, flowchart 500, and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
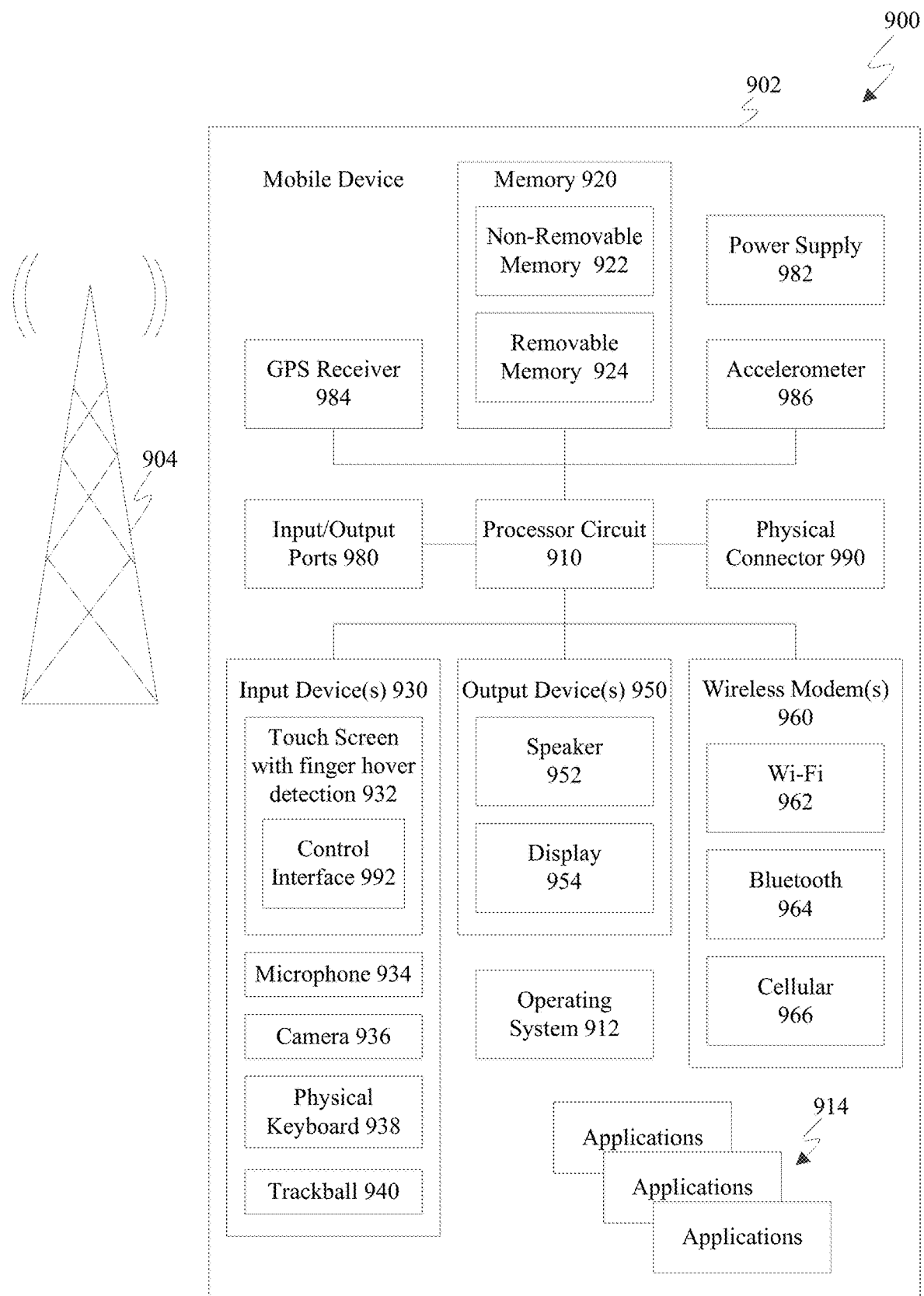
FIG. 9 shows a block diagram of an exemplary user device in which embodiments may be implemented.

FIG. 9 shows a block diagram of an exemplary mobile device 900 including a variety of optional hardware and software components, shown generally as components 902. For instance, components 902 of mobile device 900 are examples of components that may be included in user device 102, back end server 104, server 106a, server 106b, and/or second user device 108, in mobile device embodiments. Any number and combination of the features/elements of components 902 may be included in a mobile device embodiment, as well as additional and/or alternative features/elements, as would be known to persons skilled in the relevant art(s). It is noted that any of components 902 can communicate with any other of components 902, although not all connections are shown, for ease of illustration. Mobile device 900 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 904, such as a cellular or satellite network, or with a local area or wide area network.

The illustrated mobile device 900 can include a controller or processor referred to as processor circuit 910 for performing such tasks as signal coding, image processing, data processing, input/output processing, power control, and/or other functions. Processor circuit 910 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 910 may execute program code stored in a computer readable medium, such as program code of one or more applications 914, operating system 912, any program code stored in memory 920, etc. Operating system 912 can control the allocation and usage of the components 902 and support for one or more application programs 914 (a.k.a. applications, "apps", etc.). Application programs 914 can include common mobile computing applications (e.g., email applications, calendars, contact managers, web browsers, messaging applications) and any other computing applications (e.g., word processing applications, mapping applications, media player applications).

As illustrated, mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, recommendation engine 802, flowchart 200, flowchart 300, flowchart 500, and/or flowchart 700 (including any suitable step of flowcharts 200, 300, 500, and 700), and/or further embodiments described herein.

Mobile device 900 can support one or more input devices 930, such as a touch screen 932, microphone 934, camera 936, physical keyboard 938 and/or trackball 940 and one or more output devices 950, such as a speaker 952 and a display 954. Touch screens, such as touch screen 932, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 932 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches or between 0.75 inches and 1 inch, or between 1 inch and 1.5 inches, etc.

The touch screen 932 is shown to include a control interface 992 for illustrative purposes. The control interface 992 is configured to control content associated with a virtual element that is displayed on the touch screen 932. In an example embodiment, the control interface 992 is configured to control content that is provided by one or more of applications 914. For instance, when a user of the mobile device 900 utilizes an application, the control interface 992 may be presented to the user on touch screen 932 to enable the user to access controls that control such content. Presentation of the control interface 992 may be based on (e.g., triggered by) detection of a motion within a designated distance from the touch screen 932 or absence of such motion. Example embodiments for causing a control interface (e.g., control interface 992) to be presented on a touch screen (e.g., touch screen 932) based on a motion or absence thereof are described in greater detail below.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice control interface that allows a user to operate the device 900 via voice commands. Further, device 900 can comprise input devices and software that allows for user interaction via a user's spatial gestures, such as detecting and interpreting gestures to provide input to a gaming application.

Wireless modem(s) 960 can be coupled to antenna(s) (not shown) and can support two-way communications between processor circuit 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). Cellular modem 966 may be configured to enable phone calls (and optionally transmit data) according to any suitable communication standard or technology, such as GSM, 3 G, 4 G, 5 G, etc. At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be not present and other components can be additionally present as would be recognized by one skilled in the art.

Figure 10:
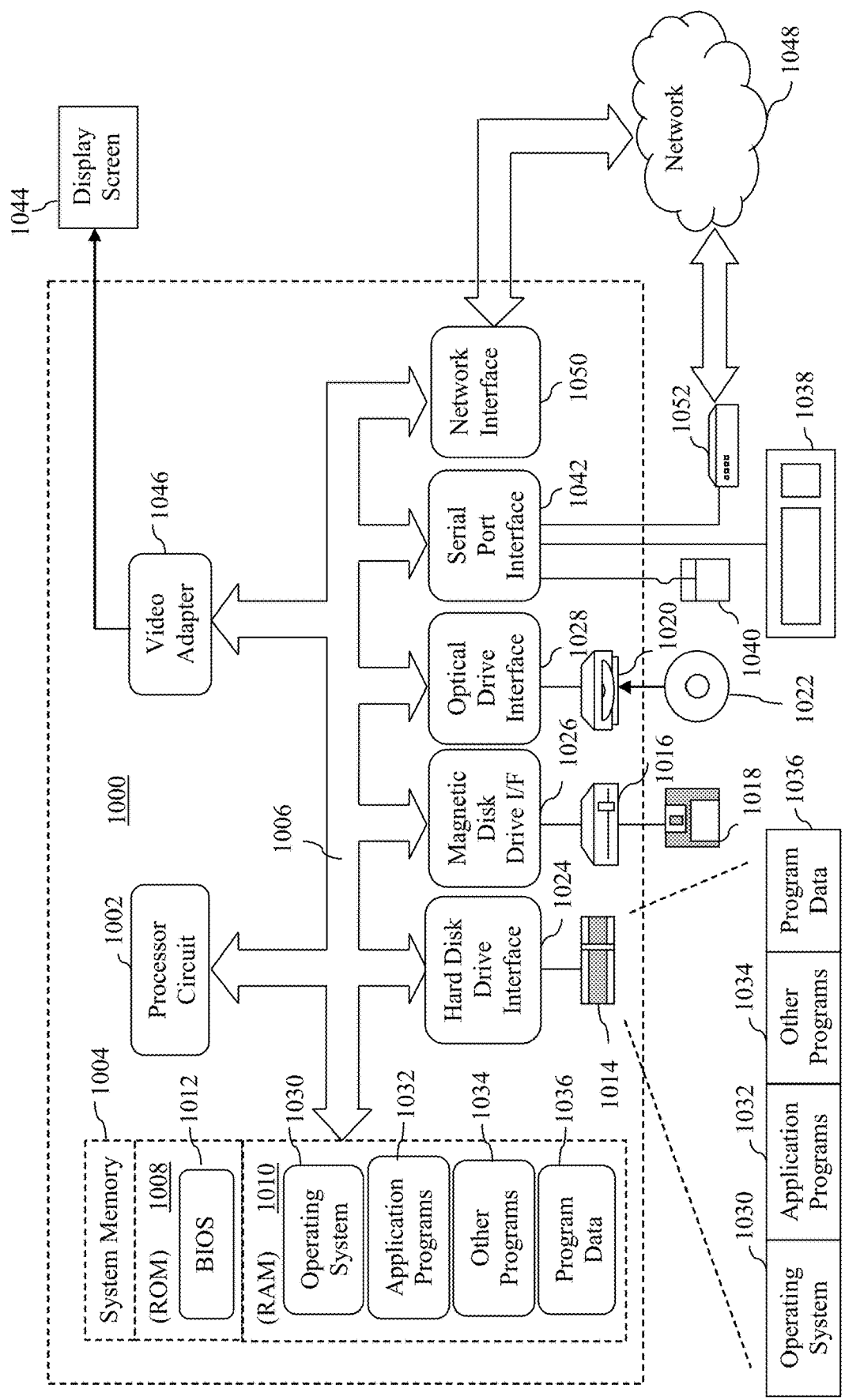
FIG. 10 shows a block diagram of an example computing device that may be used to implement embodiments.

Furthermore, FIG. 10 depicts an exemplary implementation of a computing device 1000 in which embodiments may be implemented. For example, user device 102, back end server 104, server 106a, server 106b, and/or second user device 108 may be implemented in one or more computing devices similar to computing device 1000 in stationary computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing on-device assistant service 112, explicit signal-enabled recommendation system 114, third party service 116, third party service 118, network-based assistant service 120, voiced-input interface 402, speech processing module 404, rules generator 406, recommendation engine 408, output interface 410, UI module 412, rules generator 412, recommendation engine 414, explicit signal-enabled recommendation system 432, explicit signal-enabled recommendation system 434, non-voiced input interface 436, NLP module 606, logical statement generator 608, data converter 620, recommendation engine 802, flowchart 200, flowchart 300, flowchart 500, and/or flowchart 700 (including any suitable step of flowcharts 200, 300, 500, and 700), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Additional Example Embodiments

In an embodiment, a method comprises: receiving an explicit declaration from a user of the user device in real time without the user device prompting the user, the explicit declaration is configured to influence a subsequent recommendation, the user device recognizing the explicit declaration by an identifier for an intelligent personal assistant of the user device that begins the explicit declaration; processing the explicit declaration to generate a record; generating a recommendation rule based on the generated record, the recommendation rule defining a manner in which a corresponding recommendation is provided; matching the recommendation rule with one or more environmental triggers; and executing the matching recommendation rule to generate a recommendation for the user.

In an embodiment, the processing the explicit declaration to generate a record comprises performing natural language processing on a series of words of the explicit declaration to extract one or more key features; and generating the record to include the extracted one or more key features.

In an embodiment, the executing comprises executing the matching recommendation rule to collect additional data toward subsequent generation of the recommendation for the user.

In an embodiment, the one or more environmental triggers include at least one of a time, a location, a person, an application or service, a request from the user for data, or a request by the user for a recommendation.

In an embodiment, the executing the matching recommendation rule to generate a recommendation for the user comprises issuing a query to generate query results; and the method further comprises providing at least a portion of the query results to the user in the recommendation.

In an embodiment, the explicit declaration includes a recommendation provided from a person, and the method further comprises adjusting a status of the person as an influencer on the user based on a reaction by the user to the recommendation provided by the person, a positive reaction by the user being indicated by at least one of the user actioning or liking the recommendation provided by the person, and a negative reaction of the user being indicated by at least one of the user not actioning or indicating a dislike for the recommendation provided by the person.

In an embodiment, the method further comprises: launching a question and answer session with the user in response to the explicit declaration.

In another embodiment, a recommendation system implemented in at least one computing device comprises: a voiced input interface configured to receive an explicit declaration in the form of speech from a user of a computing device in real time without the computing device prompting the user, the explicit declaration includes a series of words and is configured to influence a subsequent recommendation, the computing device recognizing the explicit declaration by an identifier for an intelligent personal assistant of the user device that begins the explicit declaration; a speech processing module configured to process the series of words of the explicit declaration to generate a record; a rules generator configured to generate a recommendation rule based on the generated record, the recommendation rule including a logical expression; a recommendation engine configured to execute the recommendation rule to generate a recommendation for the user, the recommendation rule defining a manner in which a corresponding recommendation is provided; and an output interface configured to provide the generated recommendation to the user.

In an embodiment, the speech processing module is configured to: perform natural language processing on the series of words of the explicit declaration to extract one or more key features; and generate the record to include the extracted one or more key features.

In an embodiment, the recommendation engine is configured to: match the recommendation rule with one or more environmental triggers; and execute the matching recommendation rule to perform at least one of generating the recommendation for the user or collecting additional data toward subsequent generation of the recommendation for the user.

In an embodiment, the one or more environmental triggers include at least one of a time, a location, a person, an application or service, a request from the user for data, or a request by the user for a recommendation.

In an embodiment, the voiced input interface, the speech processing module, the rules generator, and the recommendation engine are located in a user device of the user.

In an embodiment, at least one of the rules generator or the recommendation engine is located at least partially at a server that is separate from a user device to which the user provided the explicit declaration.

In another embodiment, a computer-readable storage medium comprising computer-executable instructions that, when executed by a processor, perform a method that comprises: receiving an explicit declaration from a user of a user device in real time without the user device prompting the user, the explicit declaration is configured to influence a subsequent recommendation, the user device recognizing the explicit declaration by an identifier for an intelligent personal assistant of the user device that begins the explicit declaration; processing the explicit declaration to generate a record; generating a recommendation rule based on the generated record, the recommendation rule defining a manner in which a corresponding recommendation is provided; matching the recommendation rule with one or more environmental triggers; and executing the matching recommendation rule to generate a recommendation for the user.

In an embodiment, the executing comprises: executing the matching recommendation rule to collect additional data toward subsequent generation of the recommendation for the user.

In an embodiment, the executing the matching recommendation rule to generate a recommendation for the user comprises: issuing a query to generate query results; and the method further comprises providing at least a portion of the query results to the user in the recommendation.

In an embodiment, the explicit declaration includes a recommendation provided from a person, the method further comprises: adjusting a status of the person as an influencer on the user based on a reaction by the user to the recommendation provided by the person, a positive reaction by the user being indicated by at least one of the user actioning or liking the recommendation provided by the person, and a negative reaction of the user being indicated by at least one of the user not actioning or indicating a dislike for the recommendation provided by the person.

In an embodiment, the method further comprises: launching a question and answer session with the user in response to the explicit declaration.

In an embodiment, the one or more environmental triggers include at least one of a time, a location, a person, an application or service, a request from the user for data, or a request by the user for a recommendation.

In an embodiment, the processing the explicit declaration to generate a record comprises: performing natural language processing on a series of words of the explicit declaration to extract one or more key features; and generating the record to include the extracted one or more key features.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a user device, comprising:
receiving an explicit declaration from a user of the user device in real time without the user device prompting the user;
determining that the explicit declaration from the user begins with an identifier for a digital personal assistant;
in accordance with determining that the explicit declaration from the user begins with the identifier, determining that the explicit declaration from the user is intended to influence a subsequent recommendation;

in accordance with the determination that the explicit declaration from the user is intended to influence the subsequent recommendation, causing a recommendation rule to be generated based on the explicit declaration, the recommendation rule defining a manner in which the subsequent recommendation is provided; and providing the subsequent recommendation to the user in accordance with the recommendation rule.

2. The method of claim 1, further comprising:
performing natural language processing on a series of words of the explicit declaration to extract one or more key features; and
generating the recommendation rule based on the extracted one or more key features.

3. The method of claim 1, wherein the explicit declaration comprises a non-verbal declaration.

4. The method of claim 1, further comprising storing a user profile model that contains a collection of personal data associated with the user; and
wherein the recommendation rule is further based on the user profile model.

5. The method of claim 1, wherein the explicit declaration includes a recommendation provided from a person, the method further comprising:
adjusting a status of the person as an influencer on the user based on a reaction by the user to the recommendation provided by the person, a positive reaction by the user being indicated by at least one of the user actioning or liking the recommendation provided by the person, and a negative reaction of the user being indicated by at least one of the user not actioning or indicating a dislike for the recommendation provided by the person.

6. The method of claim 1, wherein the recommendation rule comprises a logical statement with one or more operators.

7. The method of claim 1, further comprising:
launching a question and answer session with the user in response to receiving the explicit declaration.

8. A recommendation system implemented in at least one computing device, comprising:
a user interface configured to receive an explicit declaration from a user of the at least one computing device in real time without the at least one computing device prompting the user;
a processing module configured to:
determine that the explicit declaration from the user includes an identifier for a digital personal assistant;
determine that the explicit declaration is intended to influence a subsequent recommendation;
process the explicit declaration to generate a record; and
generate the subsequent recommendation to the user in accordance with a recommendation rule; and
a rules generator configured to generate the recommendation rule based on the generated record, the recommendation rule defining a manner in which the subsequent recommendation is provided.

9. The recommendation system of claim 8, wherein the user interface comprises an input interface configured to receive a non-verbal declaration from the user.

10. The recommendation system of claim 8, wherein the user interface is configured to receive the explicit declaration from the user in response to the user accepting a recommendation by another person.

11. The recommendation system of claim 8, wherein the processing module is configured to:
perform natural language processing on the series of words of the explicit declaration to extract one or more key features; and
include the extracted one or more key features in the generated record.

12. The recommendation system of claim 8, wherein the recommendation rule comprises a logical statement with one or more operators.

13. The recommendation system of claim 8, further comprising:
a storage configured to store a user profile model that contains a collection of personal data associated with the user; and
wherein the rules generator is further configured to generate the recommendation rule further based on the user profile model.

14. The recommendation system of claim 8, wherein the user interface, the processing module, and the rules generator are located in a user device of the user.

15. The recommendation system of claim 8, wherein the rules generator is located at least partially at a server that is separate from a user device to which the user provided the explicit declaration.

16. A method, comprising:
receiving an explicit declaration from a user;
determining that the explicit declaration from the user includes an identifier for a digital assistant and is intended to influence a subsequent recommendation for the user;
generating a recommendation rule based on the explicit declaration;
accessing a stored set of recommendation rules, the stored set including the generated recommendation rule;
matching a recommendation rule of the stored set of recommendation rules with one or more environmental triggers; and
generating a recommendation for the user in accordance with the matching recommendation rule.

17. The method of claim 16, wherein the one or more environmental triggers include at least one of a time, a location, a person, an application or service, a request from the user for data, or a request by the user for a recommendation.

18. The method of claim 16, further comprising:
receiving a query request from the user;
obtaining query results responsive to the query request; and
providing at least a portion of query results to the user in the recommendation.

19. The method of claim 16, further comprising:
in accordance with matching the recommendation rule and prior to generating the recommendation, collecting additional data for the subsequent generation of the recommendation for the user, wherein the recommendation is based on the collected additional data.

20. The method of claim 16, wherein the set of recommendation rules include a first recommendation rule with a first environmental trigger based on a time and a second recommendation rule with a second environmental trigger based on a location.

* * * * *